A. GUTHRIE.
Churn.

No. 24,907.  Patented July 26, 1859.

Witnesses:
Ossian Guthrie
Wm Hopkins

Inventor:
Alfred Guthrie

UNITED STATES PATENT OFFICE.

ALFRED GUTHRIE, OF CHICAGO, ILLINOIS, ASSIGNOR TO WARDELL GUTHRIE, OF SAME PLACE.

CHURN.

Specification of Letters Patent No. 24,907, dated July 26, 1859.

*To all whom it may concern:*

Be it known that I, ALFRED GUTHRIE, of the city of Chicago, in the county of Cook and State of Illinois, have invented a new and Improved Mode of Agitating Milk or Cream Required in the Art or Process of Making Butter; and I do hereby declare that the following is a full and exact description thereof, reference being had to the accompanying drawings and the letters of reference marked thereon.

The nature of my invention consists in such an arrangement of machinery as will impart to the milk or cream a rotating and centrifugal motion inside of the churn without the intervention of paddle blades or stirring arms, relying upon the concussion of the particles against the periphery of the revolving churn either with or without roughened or corrugated surfaces inside.

To enable others skilled in the art to make and use my invention I will proceed to describe its construction and operation.

Figure 3:
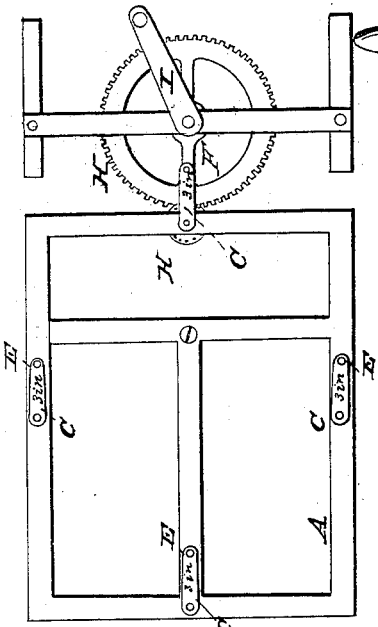
Figure 2:
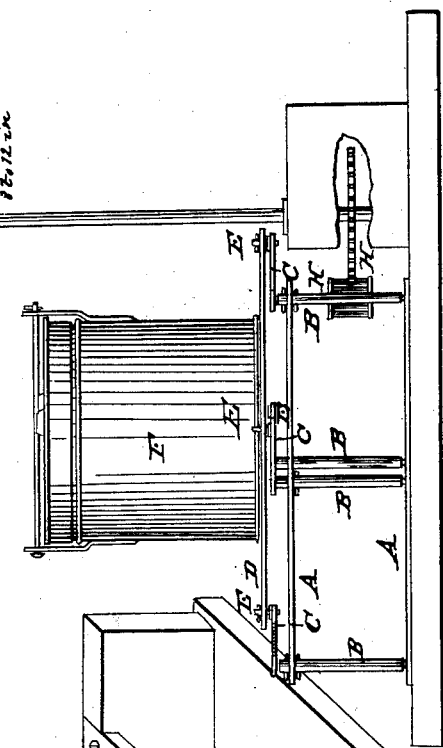
Figure 1:
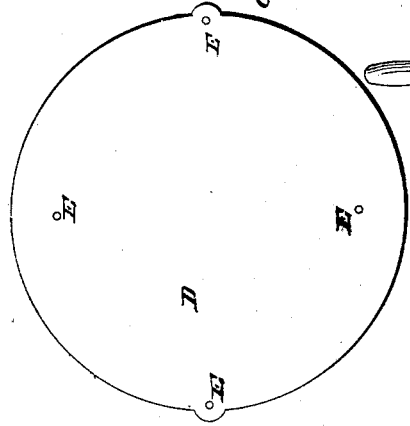

I construct a substantial frame work of wood or iron either square or a round form as fancy dictates as seen in Figs. 1, 2 and 3. I adopt for a churn for ten to twenty pounds about two feet square by one foot high. Into this frame work I adjust four vertical or upright shafts about one foot long made from three fourths inch iron as seen in B, B, B, B. Upon the upper ends of these I attach cranks with about a six inch throw or three inches as seen in C, C, C, C, these shafts and cranks being firmly attached by journal boxes to either side of the square frame. I connect the whole together by the bed plate D over the wrists of each crank E, E, E, E. Each crank will revolve upon its own center but will each correspond to the motion of the other.

To the bed plate D I attach the churning tub F holding the cream or milk which will be held firmly in its place on a grooved bottom by stirrups, or in any other suitable manner, by revolving the upright cranks through the cogged gearing H, H, and the crank I, a rotating and centrifugal impulse is given to the material inside the churning tub and by the concussion of its particles against the periphery the operation is performed.

It is not important to have exactly the four cranks for a less or greater number will give the same motion.

What I claim as my invention and desire to secure by Letters Patent is—

The combination and arrangement of the cranks C, C, C, C, connected by the plate D or its equivalent and operating in the manner and for the purpose set forth and explained substantially as herein described.

ALFRED GUTHRIE.

Witnesses:
O. GUTHRIE,
JOHN N. BRACKEN.